United States Patent
Muenchow

[11] Patent Number: 5,979,101
[45] Date of Patent: Nov. 9, 1999

[54] TIPUP LIGHT SYSTEM

[76] Inventor: Craig R. Muenchow, 609 N. Finch St., Horicon, Wis. 53032

[21] Appl. No.: 09/030,117

[22] Filed: Feb. 25, 1998

Related U.S. Application Data

[63] Continuation-in-part of application No. 08/624,072, Mar. 29, 1996, abandoned.

[51] Int. Cl.⁶ .................................................. A01K 97/12
[52] U.S. Cl. ............................................... 43/17; 43/17.5
[58] Field of Search ....................... 43/17, 17.5; 362/190

[56] References Cited

U.S. PATENT DOCUMENTS

| | | | |
|---|---|---|---|
| 5,179,797 | 1/1993 | Edwards | 43/17.5 |
| 5,205,061 | 4/1993 | Echols | 43/17.5 |
| 5,555,667 | 9/1996 | Bae | 43/17 |
| 5,797,211 | 8/1998 | Bae | 43/17 |

*Primary Examiner*—Kurt Rowan
*Attorney, Agent, or Firm*—Donald Cayen

[57] ABSTRACT

A light system for an ice fishing tipup is removably attachable to the tipup flag arm. The light system includes an environmentally safe ball switch. When the flag arm is in a restrained mode, the ball switch is open to de-energize a lamp. When the flag arm releases upon a fish strike, the ball switch closes to energize the lamp. The light system includes a waterproof sleeve that encases the components. A lens in the sleeve generally surrounds the lamp. The sleeve is attached to the flag arm by flexible bands.

5 Claims, 4 Drawing Sheets

TIPUP LIGHT SYSTEM

This is a continuation-in-part of application(s) Ser. No. 08/624,072 filed on Mar. 29, 1996 now ABN.

BACKGROUND OF THE INVENTION

1. Field of the Invention. This invention pertains to alert systems, and more particularly to signaling devices useful in ice fishing.

2. Description of the Prior Art. Various types of equipment have been developed for fishing through the ice. For example, tipups are well known and widely used.

Although ice fishing tipups are constructed with different designs and operating features, they invariably include components that hold a fishing line and a means that signals a fisherman of a strike on the line. The signaling means can be audio or visual or a combination of the two. U.S. Pat. Nos. 2,170,000; 3,359,673; and 4,246,716 show tipups that include both electrically operated light and sound emitting devices. The fish detecting systems of U.S. Pat. Nos. 4,437,255; 4,928,419; and 5,097,618 employ transmitters that activate radio receivers worn by a fisherman. The tipups of U.S. Pat. Nos. 2,170,000; 4,928,419; and 5,097,618 also include flags that snap from a horizontal attitude to a vertical attitude in response to a fish strike.

Despite the variety of tipup signaling devices available, they nevertheless are not completely satisfactory. Some switches for prior electrically operated signaling devices utilize mercury. Examples of mercury tipup switches may be seen in U.S. Pat. Nos. 3,882,629; 3,918,191; 4,479,321; 4,766,688; and 5,488,796. For environmental reasons, mercury switches are highly undesirable.

Many prior signaling devices possess the further handicap of being built into the tipup itself, so that failure of the signaling device limits the usefulness of the tipup. In addition, built-in signaling devices tend to deteriorate when the tipups are stored during the summer months. Many of the prior signaling devices are also undesirably complicated and expensive.

Accordingly, there is room for improvement in ice fishing tipups.

SUMMARY OF THE INVENTION

In accordance with the present invention, a simple and environmentally safe light system is provided that can be easily attached to and removed from an ice fishing tipup. This is accomplished by apparatus that includes a ball switch encased in a sleeve that is removably attachable to a tipup flag.

The ball switch is part of an electrical circuit that also includes a battery and a lamp. According to one aspect of the invention, the battery, ball switch, and lamp are held on a circuit board that also functions as a mechanical frame for the light system. The ball switch is comprised of a housing made of electrically non-conductive material and held to the circuit board. The housing is sized to enable a solid metal ball to roll between first and second positions inside the housing. The ball may be in contact with a first electrical wire inside the housing for both positions of the ball. The ball is out of contact with at least a second wire inside the housing when the ball is in the first position thereof. When the ball is in its second position, it contacts both the first and second wires such that the ball completes a circuit between the battery and the lamp. That is, the ball switch is closed to energize the lamp when the ball is in its second position, and the switch is open to de-energize the lamp when the ball is in its first position.

Further in accordance with the present invention, the circuit board and the components held to it are encased in a flexible but waterproof cylindrical sleeve and cap. A lens is built into one end of the sleeve. The lens surrounds the signal lamp. When the light system is activated, the lamp shines through the lens.

The tipup light system is used by securing it to the flag arm of a conventional fishing tipup. Two or more circular flexible bands encircle the sleeve and pass around the flag arm. The light system is oriented on the flag arm such that when the flag arm is in its restrained mode on the tipup, gravity acts on the ball to place it in its first position inside the housing, i.e., the ball switch is open. When a fish strike causes the tipup flag arm to release, the light system moves with an angular motion through space with the flag arm. That action results in the ball rolling to its second position and thereby closing the ball switch. As a result, the lamp becomes energized to emit a visual signal through the sleeve lens to a fisherman. After removing the fish, the fisherman resets the flag to its restrained mode. That action automatically opens the ball switch and de-energizes the lamp. At the end of a day's fishing, the light system can be quickly removed from the tipup flag arm for safe storage.

The method and apparatus of the invention, using a simple and environmentally safe switch, thus signals a fish strike. The ball switch assures trouble free operation, even though the light system can be easily removed from and reattached to the tipup flag arm.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
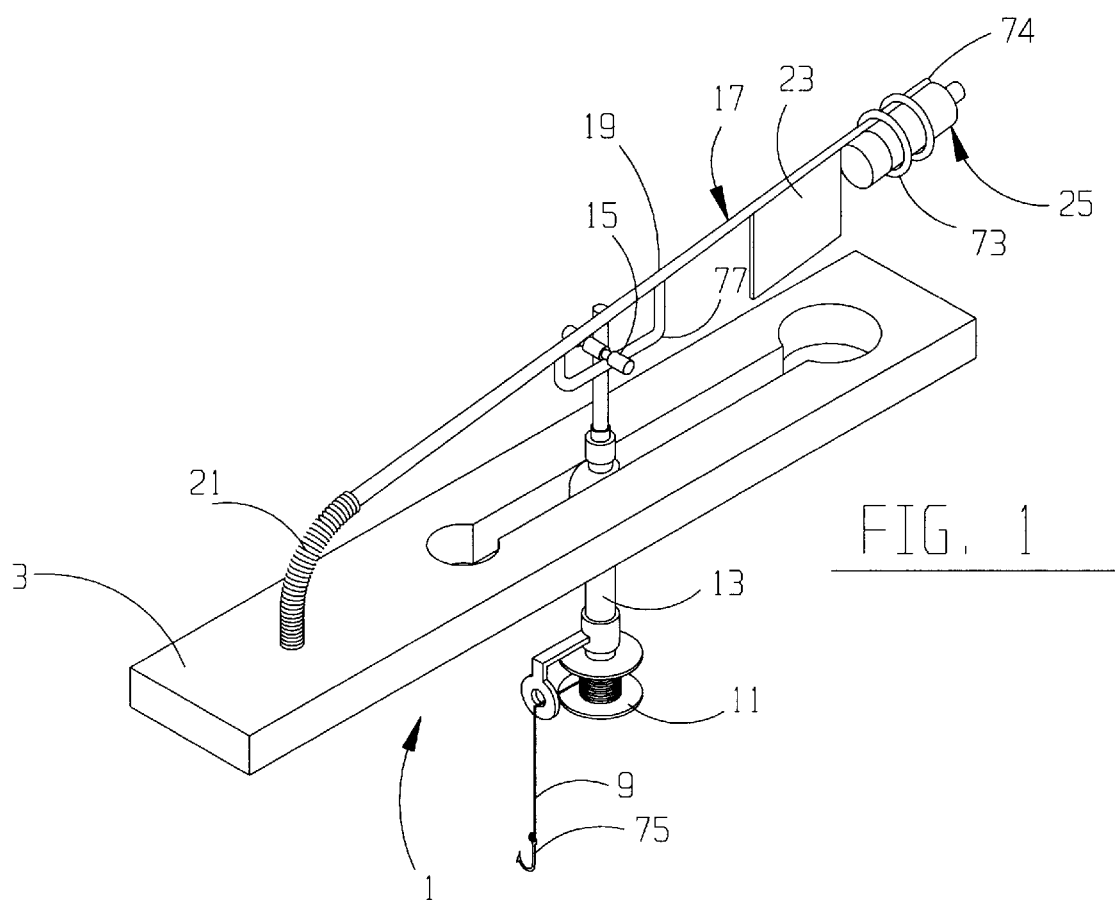
FIG. 1 is a perspective view of a typical ice fishing tipup showing a flag thereof in a restrained mode and with the light system of the invention attached to the flag arm.

Referring to FIG. 1, an ice fishing tipup 1 is illustrated that includes the present invention. The particular tipup 1 shown is merely representative of a wide variety of ice fishing tipups with which the present invention can be utilized, and the tipup itself forms no part of the invention.

The tipup 1 illustrated has a base 3 that rests on the ice and straddles a hole, not shown, in the ice. A supply of fishing line 9 is wound on a reel 11. The reel 11 is supported on a vertical shaft 13, which is mounted in the base 3 for rotation about a vertical axis. To the upper end of the shaft 13 is fixed a horizontal pin 15.

The tipup 1 includes a signal device in the form of a mechanical flag alert 17. The flag alert 17 is comprised of an arm 19 that is flexibly connected at one end, as by a spring 21, to the base 3. To the second end of the arm 19 is tied a piece of bright colored material 23.

Figure 3:
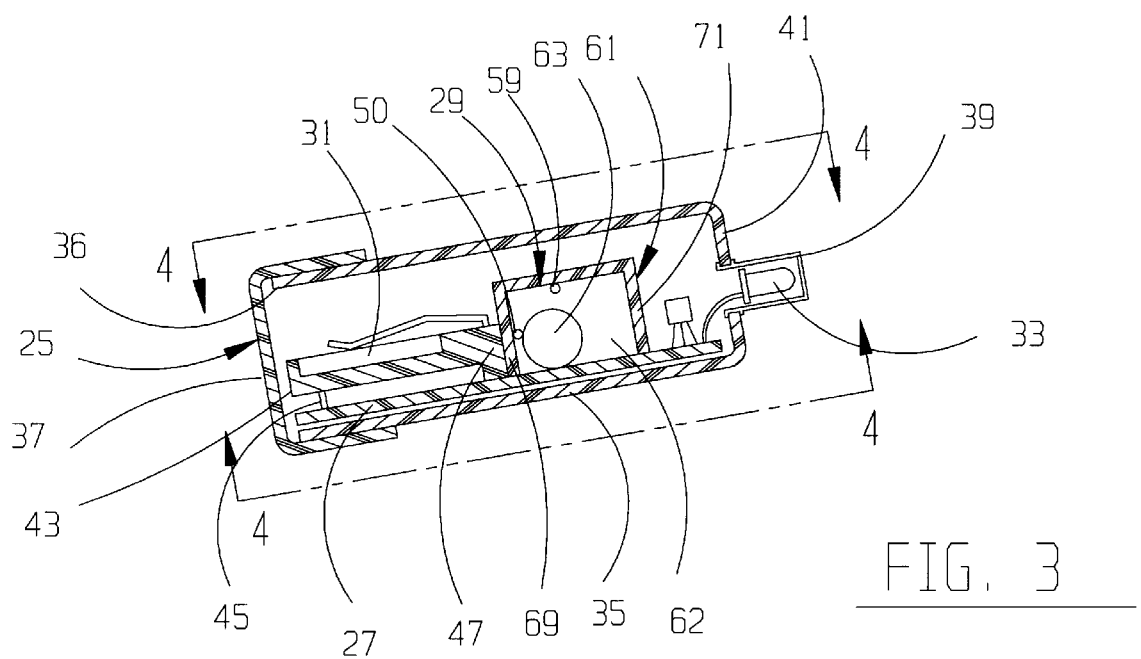
FIG. 3 is a longitudinal cross sectional view of the light system of the invention shown in its orientation of FIG. 1.
Figure 4:
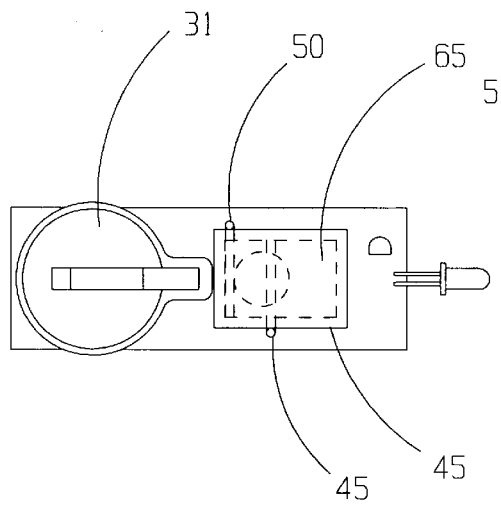
FIG. 4 is a view taken along line 4—4 of FIG. 3, but omitting the sleeve of the invention.
Figure 5:
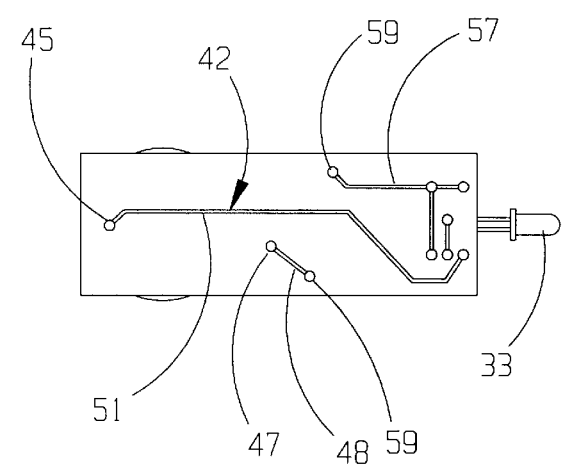
FIG. 5 is a view taken along line 5—5 of FIG. 3, but omitting the sleeve of the invention.

In accordance with the present invention, the tipup 1 is equipped with a light system 25 that greatly enhances the signal given by the flag alert 17 of a fish strike. Looking also at FIGS. 3–5, the light system 25 comprises a frame 27, a ball switch 29, a battery 31, and an electrical lamp 33. The foregoing components are encased in a waterproof sleeve 35 and a cap 37.

In the preferred embodiment, the frame 27 of the light system 25 is a circuit board that both mechanically holds the other components of the light system in place and that conducts electricity along a circuit 42 between the components. Specifically, the frame holds a battery holder 43 that has two electrical leads 45 and 47 through it to the circuit board. The lead 47 joins to a metal clip 49 that retains the battery 31 in the battery holder 43. The lead 47 connects by a conductive path 48 to a first wire 50. The lead 45 connects by a conductive path 51 to a current limiting device 53. The current limiting device 53 electrically connects to the lamp 33, which preferably is a light emitting diode. Another electrical path 57 leads from the lamp and the current limiting device to a second wire 59.

The ball switch 29 is comprised of a non-conductive housing 61 that is held to the frame 27. The housing 61 has opposed parallel side walls 62 and 67, a top wall 65, and opposed parallel end walls 69 and 71. The walls 62, 65, 67, 69, and 71 define a rectangular space inside the housing. A metal ball 63 made as a solid sphere is captured and is free to roll for slight distances inside the housing.

In the illustrated construction, the first wire 50 runs outside of the side wall 62 of the housing 61 for approximately half the distance between the frame 27 and the top wall 65. The first wire passes through the side wall 62 and runs parallel to and along the inside of the end wall 69 almost to the second side wall 67. The second wire 59 runs parallel to and along the housing side wall 67 almost to the top wall. The second wire passes through the side wall 67 and runs along the inside of the top wall almost to the side wall 62. It will be appreciated that the electrical circuit 42 between the battery 31 and the lamp 33 is interrupted by the space between the wires 50 and 59 inside the housing 61.

The sleeve 35 is made as a continuous cylindrical tube of flexible waterproof material. The sleeve tube has a constant wall thickness between its two ends 36 and 41. The sleeve end 36 has an integral closed end. The sleeve end 41 is open. A cap 37 seals the sleeve open end. A tubular lens 39 is built into and protrudes from the sleeve closed end. The lens is assembled in a waterproof manner to the sleeve.

The circuit board frame 27 with the battery holder 43 and battery 31, housing 61 and ball 63, and lamp 33 are placed in the sleeve 35 such that the lamp enters the lens 39. Then the cap 37 is sealed in place over the sleeve open end 36. The resulting light system 25 is secured to the arm 19 of the tipup flag alert 17 by a pair of circular bands 73, which may be flexible rubber rings. The bands 73 encircle substantially the entire periphery of the sleeve and pass around the arm to secure the light system to the arm. Also see FIGS. 1 and 2. Preferably, the light system is located at the free end 74 of the flag arm.

The fisherman uses the tipup 1 in known manner. He baits the hook 75 and sets it at the desired depth in the water. He then sets the flag alert 17 by bending the arm 19 to be approximately horizontal. He rotates the shaft 13 such that the pin 15 overlies a loop 77 on the arm. When the fisherman releases the arm, it is constrained in the restrained mode of FIG. 1 by the shaft pin. When the flag alert 17 is in the restrained mode of FIG. 1, the light system 25 is in the orientation of FIG. 3. In that orientation, the ball 63 may contact the first wire 50, but the ball does not contact the second wire 59. Consequently, the circuit 42 through the lamp 33 is open, and the lamp is not energized.

Figure 2:
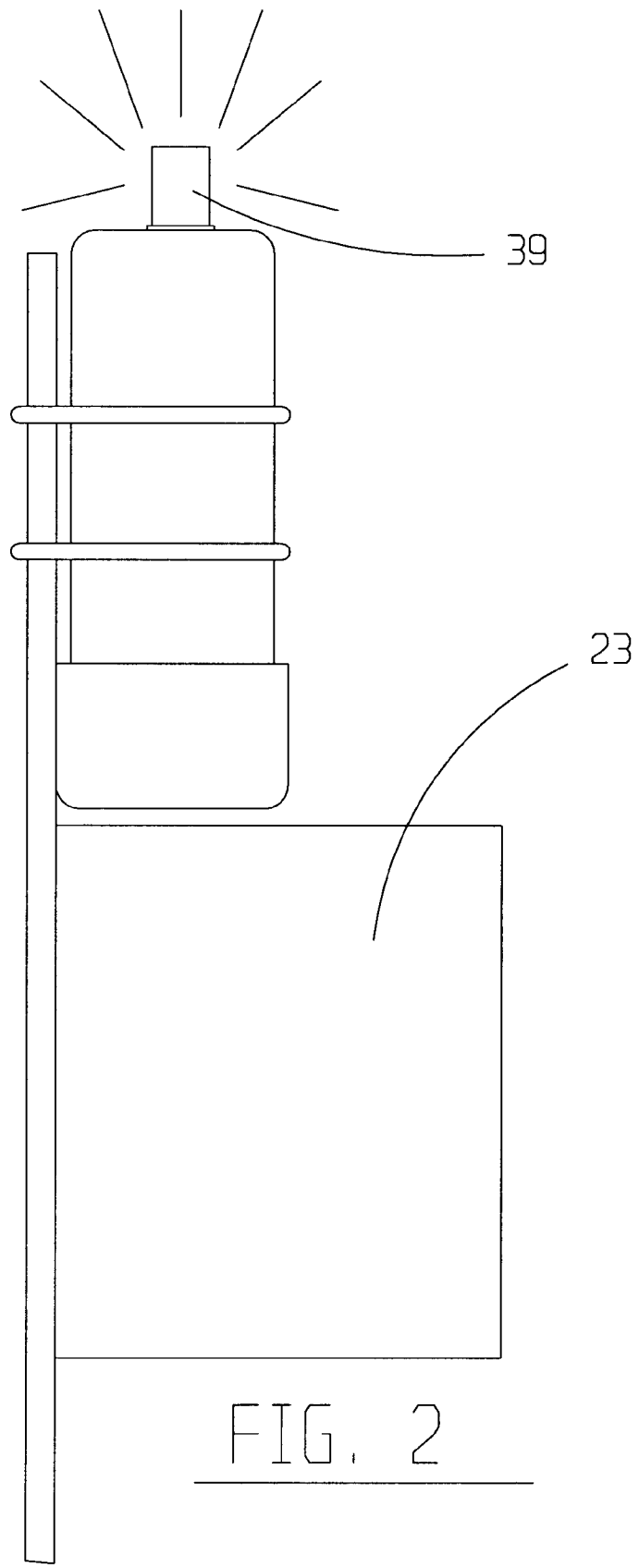
FIG. 2 is a partial view similar to FIG. 1, but on an enlarged scale and showing the flag in a released mode.
Figure 6:
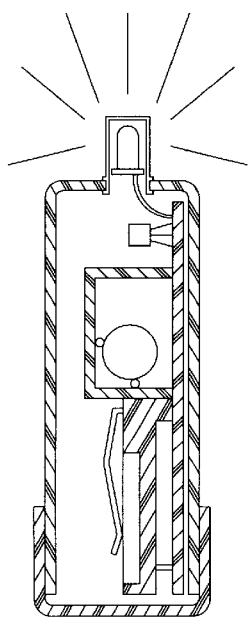
FIG. 6 is a view similar to FIG. 3, but showing the light system of the invention in its orientation of FIG. 2.

However, when a fish strikes the hook 75 and pulls the line 9, the shaft 13 and pin 15 rotate to release the flag arm 19. The spring 21 causes the arm to attain a release mode as shown in FIG. 2. The light system 25 also moves through space to attain the orientation of FIGS. 2 and 6. In that situation, the ball 63 rolls to simultaneously make contact with both wires 50 and 59. As a result, the circuit 42 through the lamp 33 is closed, and the lamp becomes energized. The glow of the lamp is magnified through the lens 39 to alert the fisherman of the strike. After reeling in the fish, the fisherman resets the flag alert 17 to the restrained mode of FIG. 1, thereby automatically returning the light system to the orientation of FIG. 3, which causes the ball 63 to roll out of contact with at least the wire 59 to de-energize the lamp.

In summary, the results and advantages of ice fishing tipups can now be more fully realized. The light system 25 provides a visual signal of a fish strike that is not only produced by environmentally safe components but also that automatically turns off merely by resetting the tipup. This desirable result comes from using the combined functions of the ball switch 29. When the flag alert 17 is in the restrained mode, the ball switch is open such that the lamp 33 is de-energized. When a fish strike causes the flag alert to release, the ball switch closes to energize the lamp. The light system includes a waterproof sleeve 35 and cap 37. Flexible bands 73 removably attach the light system to and remove it from the flag alert arm, thereby enabling the light system to be easily stored independently of the tipup 1.

It will also be recognized that in addition to the superior performance and environmental benefits of the light system 25, its construction is such as to cost little, if any, more than conventional tipup signaling systems. Also, since mechanical components are virtually eliminated, the need for maintenance is minimal.

Thus, it is apparent that there has been provided, in accordance with the invention, a tipup light system that fully satisfies the aims and advantages set forth above. While the invention has been described in conjunction with specific embodiments thereof, it is evident that many alternatives, modifications, and variations will be apparent to those skilled in the art in light of the foregoing description. For example, more than one lamp 33 may be employed, and the lamps may be of different colors. In addition, the circuit 42 may be designed such that the lamp either glows steadily or flashes intermittently when the ball switch 29 is closed. Accordingly, it is intended to embrace all such alternatives, modifications, and variations as fall within the spirit and broad scope of the appended claims.

I claim:

1. A tipup light system for use with a tipup arm comprising:

a. a circuit board;

b. a battery held to the circuit board;

c. a lamp held to the circuit board;

d. an electrically non-conductive housing held to the circuit board and defining a generally rectangular interior space;

e. a spherical electrically conductive ball made of a solid material captured in the housing interior space for rolling between first and second positions therein;

f. electrical circuit means incorporated into the circuit board for opening between the battery and the lamp when the ball is in the first position thereof and for closing between the battery and the lamp when the ball is in the second position thereof, the electrical circuit means comprising:

i. a first wire having a first end electrically connected to the circuit board and a second end located inside the housing at a location whereat it is contacted by the ball when the ball is in the second position thereof; and ii. a second wire having a first end electrically connected to the circuit board and a second end located inside the housing at a location whereat it is contacted by the ball when the ball is in the second position thereof but is not contacted by the ball when the ball is in the first position thereof, the electrical circuit means being opened when the ball does not simultaneously contact the second wire and being closed when the ball simultaneously contacts the first and second wires;

g. a cylindrical sleeve surrounding the circuit board, battery, and housing; and h. at least one circular band substantially encircling the sleeve for passing over a tipup arm to removably secure the tipup light system to the tipup arm, so that the lamp is energized when the ball rolls to the second position thereof and is de-energized when the ball rolls to the first position thereof.

2. In combination with an ice fishing tipup having a flag arm, an environmentally safe light system comprising:

a. a frame;

b. an electrically conductive spherical ball made of a solid material;

c. a rectangular housing held to the frame for capturing the ball to roll therein between first and second positions, the housing comprising first and second opposed parallel side walls, first and second opposed parallel end walls, and a top wall that cooperates with the side and end walls to define a generally rectangular interior of the housing;

d. a lamp held to the frame;

e. a first wire having a first end electrically connected to the frame and a second end located inside the housing parallel to and along the first end wall at a location whereat it is contacted by the ball when the ball is in the second position thereof;

f. a second wire having a first end electrically connected to the frame and a second end located inside the housing parallel to and along the top wall at a location whereat it is contacted by the ball when the ball is in the second position thereof but is not contacted by the ball when the ball is in the first position thereof, the lamp being de-energized when the ball is in the first position thereof, the lamp being energized when the ball is in the second position thereof; and g. means for removably securing the frame and housing to the tipup flag arm.

3. The combination of claim 2 wherein the means for removably securing the frame and housing to the tipup flag arm comprises:

a. a continuous tubular sleeve having a constant wall thickness, an open end, and a closed end;

b. a lens protruding from the sleeve closed end;

c. a cap sealing the sleeve open end; and d. at least one circular band substantially encircling the sleeve and passing around the tipup flag arm to secure the light system to the tipup flag arm.

4. Apparatus for catching fish through the ice comprises:

a. base means for resting on the ice;

b. reel means supported on the base means for holding a fishing line;

c. flag means connected to the base means for being initially restrained by the reel means and for releasing from the reel means in response to a strike on the fishing line; and d. a light system removably attached to the flag means comprising:

i. a lamp; and ii. circuit means for energizing the lamp when the flag means is released by the reel means and for automatically de-energizing the lamp when the flag means is restrained by the reel means, wherein the circuit means comprises:

an electrically conductive solid sphere in a housing having an end wall and a top wall substantially orthogonal to the end wall, the sphere rolling to a first position when the flag means is restrained by the reel means and to a second position when the flag means is released by the reel means;

a battery; and a first wire inside and parallel to the housing end wall and a second wire inside and parallel to the housing top wall, the first and second wires being contacted simultaneously by the sphere when the sphere is in the second position thereof to close an electrical circuit between the lamp and the battery, the sphere rolling out of contact with the second wire when the sphere is in the first position thereof to open the electrical circuit between the lamp and the battery.

5. A method of alerting a fisherman of a fish strike comprising the steps of:

a. providing an ice fishing tipup having a flag arm;

b. providing a light system comprising the steps of:

i. capturing a solid sphere inside the rectangular housing;

ii. electrically connecting a first end of a first wire to a circuit board and a second end of the first wire to the inside of a first wall of the housing;

iii. electrically connecting a first end of a second wire to the circuit board and a second end of the second wire to the inside of a second wall of the housing that is orthogonal to the first wall; and iv. encasing the circuit board and housing in a cylindrical sleeve;

c. encircling the sleeve with at least one circular band and passing the band over the flag arm and thereby securing the light system to the flag arm;

d. baiting and setting a fishing line;

e. restraining the flag arm to a restrained mode whereat the light system is in a first orientation and the sphere is in contact with only the second end of the first wire;

f. automatically de-energizing a lamp of the light system in response to the light system being in the first orientation;

g. releasing the flag arm to a released mode and simultaneously moving the light system to a second orientation in response to a strike on the fishing line whereat the sphere simultaneously contacts the second ends of the first and second wires; and h. energizing the lamp of the light system in response to the light system being in the second orientation.

\* \* \* \* \*